Dec. 21, 1937.  J. H. COHEN  2,103,146

WINDSHIELD HEATER

Original Filed March 21, 1934

INVENTOR
BY Joseph H. Cohen
ATTORNEY

Patented Dec. 21, 1937

2,103,146

UNITED STATES PATENT OFFICE 2,103,146

WINDSHIELD HEATER

Joseph H. Cohen, Bridgeport, Conn., assignor to Casco Products Corporation, Bridgeport, Conn., a corporation of Connecticut Original application March 21, 1934, Serial No. 716,659. Divided and this application January 17, 1936, Serial No. 59,493

6 Claims. (Cl. 219—19)

This invention relates to electrically operated heaters for windshields of motor vehicles and the like.

This application is a division of my copending application Serial No. 716,659, filed March 21, 1934.

An object of this invention is to provide improved means for attaching the heating wires to the parts carrying them in such a way as to avoid the necessity of making knots in the wires and thereby weakening the same.

Other features and advantages will hereinafter appear.

In the accompanying drawing—

As shown in the accompanying drawing, the device of the present invention comprises a metal frame 10 preferably made of sheet metal and being generally rectangular in shape with round corners. At each end of the frame there is a projecting arm 11 carrying a suction cup 12 by means of which the device may be attached to the window or windshield of a motor vehicle or the like.

Figure 1:
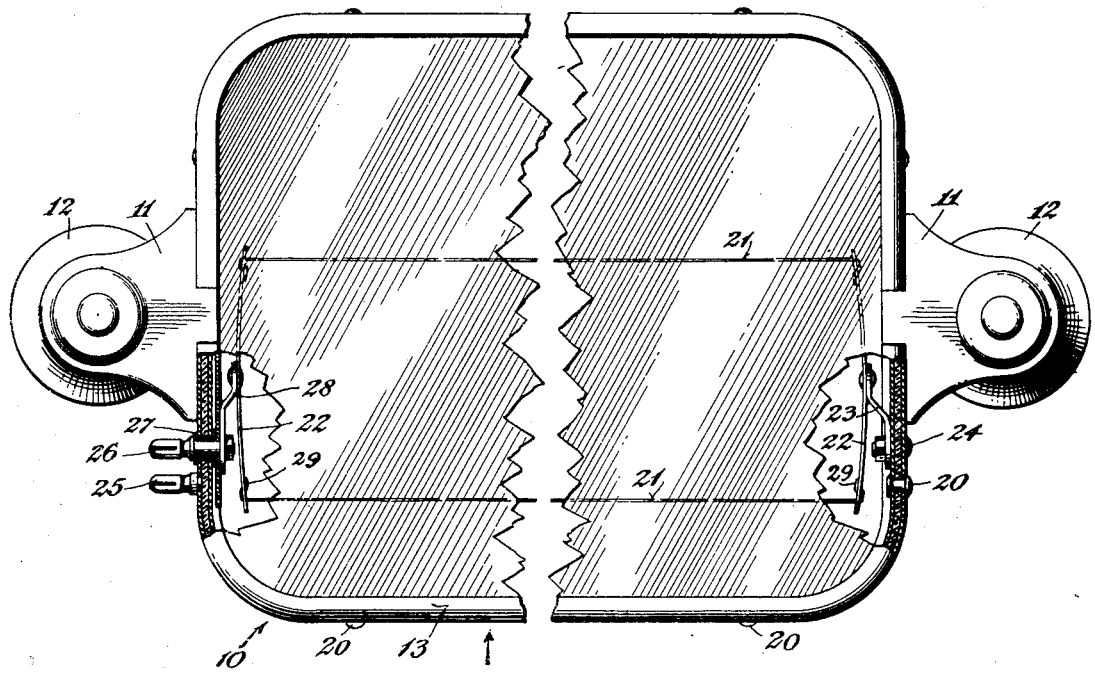
Figure 1 is a front elevation, partly in section, of the windshield heater of the present invention.
Figure 2:
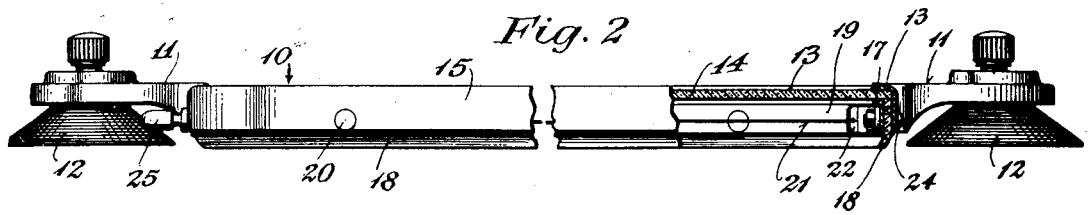
Fig. 2 is a side elevation, partly in section, of the device shown in Fig. 1.
Figure 3:
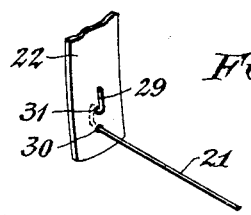
Fig. 3 is a detail perspective view showing the way in which the heating wire is connected to its carrying part according to the present invention.

The frame has a narrow front margin 13 behind which is supported a window or glass 14 through which the cleared portion of the windshield may be viewed. As shown in Figs. 1 and 2, the glass 14 bears directly on the front portion 13 of the frame, and, lying alongside of a circumferential flange 15, there is a packing strip 16, preferably of rubber. The packing or sealing strip 16 has a flange 17 overlying the flange 13 of the frame and engaging the glass. The rubber packing or sealing piece 16 is provided with a lip 18 adapted to engage the windshield and form a moisture-tight seal to prevent condensation from forming on the inside portion of the windshield over which the device is supported.

The sealing strip 16 is held in place by narrow metal strips 19 extending around the inside of the sealing strip and held to the main frame by rivets 20.

The space between the glass 14 and the windshield is heated by heating wires 21 of which there may be two or more stretched across the field covered by the glass. These wires are mounted on resilient strips 22 at each end of the frame. One of the strips 22 is connected to an arm 23 and this is secured to the main frame by a bolt 24 so that current may reach the connected resilient strip 22 through the frame. At the other end of the frame, a contact pin 25 is electrically and mechanically connected to the frame 10 as shown in Fig. 1. The companion contact pin 26, however, is insulated from the frame by insulating material 27 and supports at its inner end an arm 28 carrying the adjacent resilient bar 22, the arm 28 being insulated from the frame and a suitable plug and cord connected to a source of current being applied to the pins, current will flow from the pin 25 through the frame to the arm 23, thence through the arm 22, wire 21 and the opposite arm 22, the arm 28 carrying the latter and the pin contact 26.

Heretofore, the wires 21 were secured to carrying bars 22 by being passed through an aperture and then knotted or tied. According to the present invention, this operation which of necessity weakened the structure of the wire and was tedious and time-consuming, is obviated. This is done by weaving the end 29 of the wire first through an aperture 30 to the opposite side of the arm 22 and then forwardly through a similar aperture 31, after which the end 29 of the wire is bent down to lie substantially in the plane of the arm 22. When this is done, any pull on the wire causes the end 29 to jam against the sides of the apertures 30 and 31, with the result that the wire is held from slipping with relation to the bar 22. Since the bars 22 are resilient and the wires are normally under tension, the wire, immediately upon being secured in place, becomes clutched by the bar 22, and, since the tension is never relieved, no slippage can take place.

Variations and modifications may be made within the scope of this invention and portions of the improvements may be used without others.

Having thus described the invention, what is claimed as new and for which it is desired to obtain Letters-Patent, is:—

1. A windshield heater comprising a frame; a resistance wire stretched across the frame; and means at the sides of the frame for supporting and connecting said resistance wire, said means including a bar having a pair of apertures, and an end of said wire passing in and out through said apertures in a tortuous path and being held to said bar by the resistance of said wire against rebending under tensional stress, the tortuous engagement of said wire-end with said bar being the sole means of holding the wire and bar together.

2. A windshield heater comprising a frame; a resistance wire stretched across the frame; and means at the sides of the frame for supporting and connecting said resistance wire, said means including a resilient bar having a pair of apertures, and an end of said wire passing in and out through said apertures in a tortuous path and being held to said bar by the resistance of said wire against rebending under the tensional stress imported thereto by said resilient bar.

3. A windshield heater, as in claim 1, in which the apertures in the bar extend in the general direction of extension of the wire and the extreme end portion of the wire is bent at right angles with relation to the apertures and away from the same.

4. A windshield heater comprising a frame; a resistance wire stretched across the frame; and means at the sides of the frame for supporting and connecting said resistance wire, said means including a pair of bars one at each side of the frame and each having a pair of apertures, one at least of said bars being resilient, each end of said wire passing in and out through the apertures of each bar in a tortuous path, the wire being normally under tension between the bars thereby to hold both tortuously bent ends of the wire against rebending, such holding of the wire against rebending being the sole means of coupling the wire and bar together.

5. In a windshield heater having a frame and a resilient bar for engaging one end of a resistance wire tautly extended across the frame opening and anchored at its other end within the frame to impose a pulling strain on said bar against the resiliency thereof, a connection between the bar and the bar-engaging end of the wire including the walls of a pair of spaced apertures piercing the bar at an angle to the flat thereof, the bar-engaging end of the wire passing first through one of said apertures in one direction, then passing through the other of said apertures in the opposite direction, and then bent over to lie substantially parallel with the flat of the bar, said engagement of the wire-end with the bar being the sole means for attaching one to the other.

6. In a windshield heater having a frame and a resilient bar for engaging one end of a resistance wire tautly extended across the frame opening and anchored at its other end within the frame to impose a pulling strain on said bar against the resiliency thereof, a connection between the bar and the bar-engaging end of the wire including the walls of a pair of spaced apertures piercing the bar at an angle to the flat thereof, the bar-engaging end of the wire being bent to pass in reverse directions through both said apertures and being further bent to provide a substantially Z-shaped formation beyond one of said apertures with the middle staff of the Z passing through the other of said apertures.

JOSEPH H. COHEN.